Sept. 14, 1965 C. V. PEREDA 3,205,653
POWER TRANSMISSION SYSTEM
Filed Dec. 3, 1962 3 Sheets-Sheet 1

INVENTOR
CELEDONIO V. PEREDA
BY Joseph Osheff,
ATTORNEYS

INVENTOR
CELEDONIO V. PEREDA
BY Joseph Osheroff
ATTORNEY

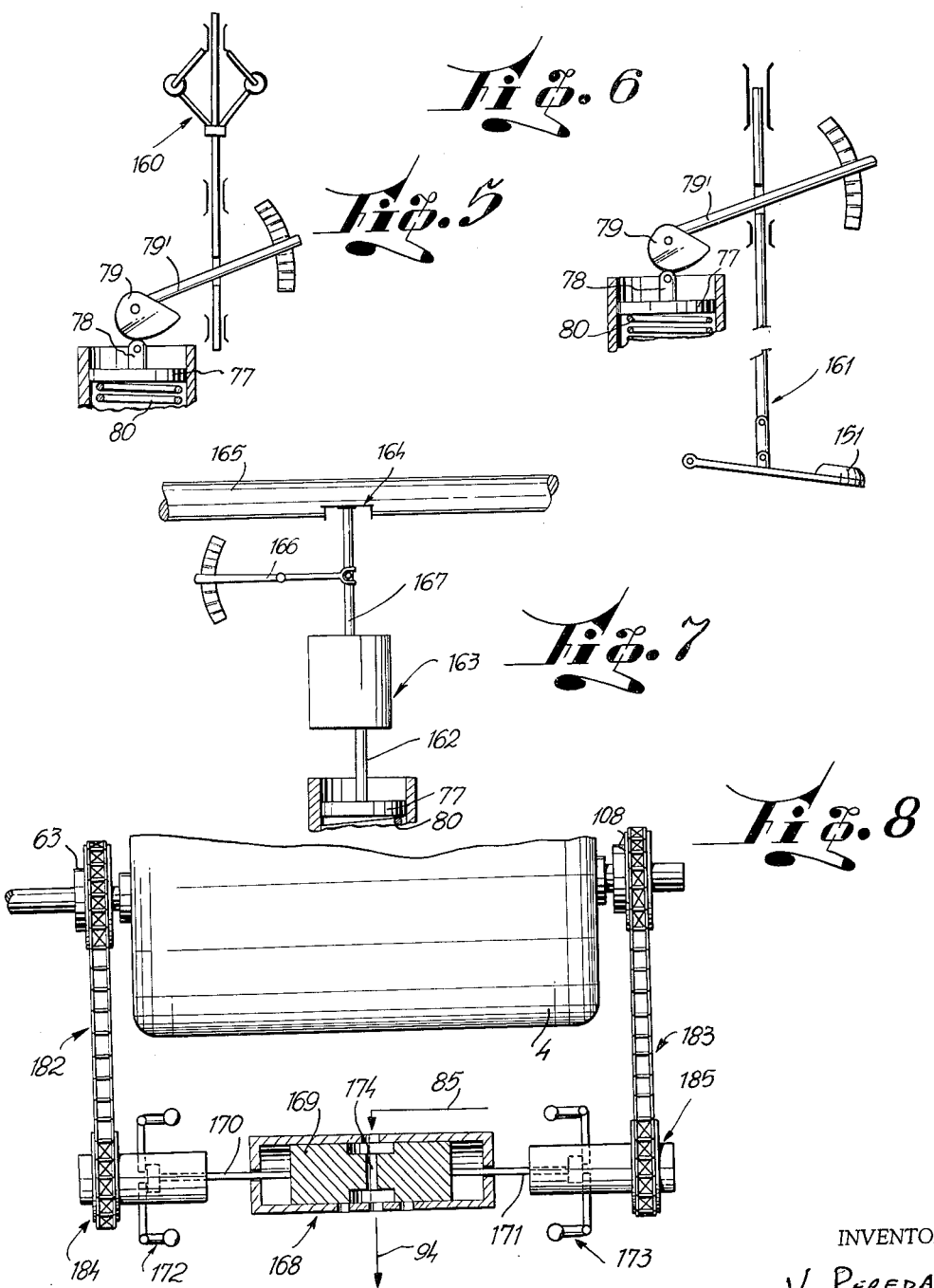

United States Patent Office 3,205,653
Patented Sept. 14, 1965

3,205,653
POWER TRANSMISSION SYSTEM
Celedonio Vicente Pereda, 323 Cordoba St.,
Buenos Aires, Argentina
Filed Dec. 3, 1962, Ser. No. 241,887
20 Claims. (Cl. 60—19)

This invention refers to a power transmission system for transmitting a driving torque to a power take-off, controlled by the resistance torque at the power take-off; more particularly, the power transmission system can transmit a certain maximum power, at different speeds, depending on the resistance torque magnitude.

The power transmission system of the present invention is usually coupled between the output shaft of an engine such as an internal combustion engine and the driving wheels or the like such as rail track treads of a vehicle, although the invention is not limited thereto, as will be apparent to anybody skilled in the art. For instance, the invention could be applied to cranes or agricultural implements.

More particular, the power transmission system according to the present invention is preferably a hydraulic transmission system which may for instance be used in self-propelling machines driven by internal combustion engines, where the hydraulic transmission system only operates upon starting the machine or when the torque or load reaches a predetermined limit; as soon as the number of revolutions of the driven shaft is substantially equal to the number of revolutions of the driving shaft, the pump of the hydraulic system does not deliver any more work and thereby a direct transmission is established between the driving and driven shafts.

In the last twenty years, it has been a general tendency to overcome the drawbacks of mechanical gear boxes, which are well known, by hydraulic transmission systems, whereby the stepwise change of transmission ratio is replaced by a smooth progressively continuously changing transmission ratio, in accordance with the requirements.

It would go too far to analyze all the different known principles of hydraulic transmission systems, it being sufficient to point out that one of the outstanding drawbacks of these known hydraulic systems resides in that the hydraulic system is continuously operated, as long as the engine operates or at least as long as the vehicle moves.

Since all these hydraulic systems require pump means and hydraulic motors for their operation, as a maximum the mechanical efficiency of the system will be equal to that of those elements and will decrease as the wear and tear increases.

It is an aim of the present invention to provide a transmission system which takes a full advantage of the hydraulic transmission system, but uses devices which reduce the drawbacks, by providing a direct transmission without pump or hydraulic motor fluid leakages. Therefore, the following advantages are achieved by the present invention:

(1) The mechanical precision tooled elements will have a longer life.

(2) The efficiency of the transmission will be increased when the system works in "direct transmission."

Although in the foregoing description reference is mainly made to "a hydraulic transmission" as far as the present invention is concerned, it will be obvious that under special circumstances instead of using a liquid, another suitable medium could, at least in part of the system, be employed. Thus the more generic expression "fluid transmission system" should be borne in mind, since for instance, compressed air, electrically controlled relay systems or the like could be used, as is apparent to anybody skilled in the art, and therefore the expression "hydraulic transmission system" is not limitative.

Thus, the present invention relates to a power transmission system for transmitting a driving torque from a prime mover, having a driving shaft, to a power take-off, controlled by the resistance torque of the power take-off, including a single member pump and hydraulic motor rotor having a front shaft adapted to be coupled to said driving shaft, at least two angularly spaced apart radially arranged first cylinder bores in said rotor adjacent said front shaft, a pumping piston slidably arranged in each of said first cylinder bores and having free ends projecting out of said rotor, a pump delivery control ring member surrounding part of said rotor, said free ends of said pumping pistons abutting against said ring member, means for controlling the eccentricity of said ring member with regard to said rotor, at least two further angularly spaced apart radially arranged second cylinder bores in said rotor and axially spaced apart from said first cylinder bores, a hydraulic motor piston slidably arranged in each of said second cylinder bores and having free ends projecting out of said rotor, distributor means controllably connecting said first cylinder bores to said second cylinder bores, a substantially cup-shaped fly wheel member surrounding said free ends of said hydraulic motor pistons, said cup-shaped fly wheel member having a rear shaft substantially coaxial with said front shaft, a driven shaft substantially parallel with said rear shaft. The single member pump hydraulic motor rotor arrangement further controlling a control fluid circuit, a control fluid pump driven by said rotor for said circuit, a resistance torque sensing means resiliently coupling said rear shaft to said driven shaft, said resistance torque sensing means, said means for controlling the eccentricity of said ring member and said distributor means forming part of said control fluid circuit, said resistance torque sensing means controlling the pressure of said control fluid circuit.

It is an object of the present invention to provide a power transmission system, the operation of which is extremely simple, due to the fact that speed variation, the change over from a hydraulic variable transmission ratio to a direct transmission between the driving shaft and the driven shaft and the reverse operation is automatically performed.

It is a further object of the present invention to provide means which automatically change the output or delivery of the pump of the hydraulic system, in accordance with the resistance torque, in order to obtain a smooth progressively continuously changing transmission ratio.

It is another object to decrease the fuel consumption of the engine, by automatically varying the driving torque without substantially requiring the human factor, i.e. the driver does not have to react, which is always in detriment of the possible best use of the power generated by the engine.

It is still a further object to decrease maintenance cost of the hydraulic system, since the piston elements of the pump and hydraulic motor only perform a reciprocating movement during short periods, because the direct drive will operate during longer periods than the hydraulic transmission.

These and further objects and advantages of the present invention will become more apparent during the course of the following description, wherein reference is made to several specific embodiments, in relationship to the accompanying drawings, wherein:

FIGURES 5, 6 and 7 show respective alternative embodiments, in schematic longitudinal section, for controlling the distributor.

FIGURE 8 is a schematic longitudinal section of an alternative embodiment for controlling the slide valve.

Figure 1:
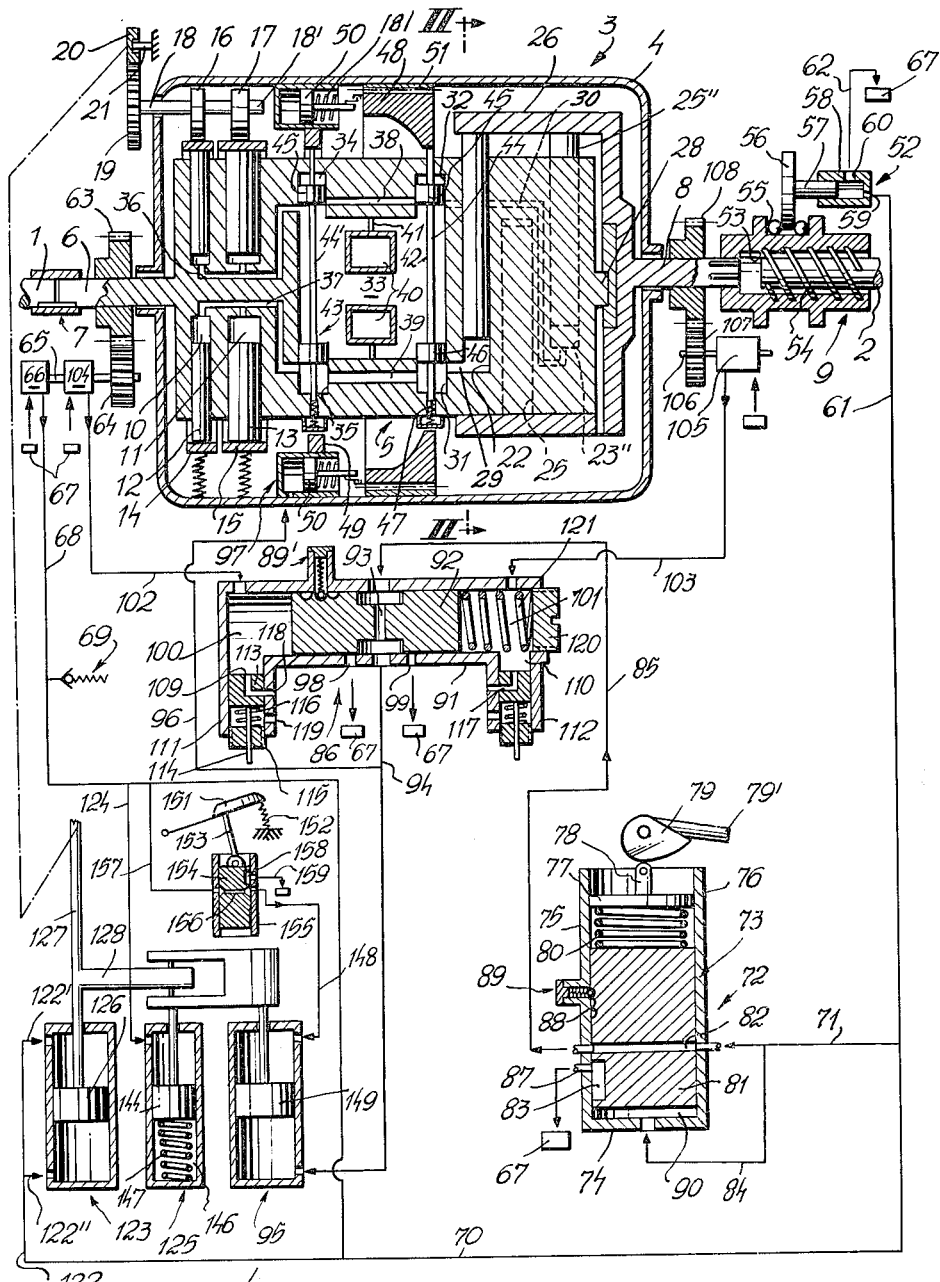
FIGURE 1 is a schematic lay-out of the power transmission system, according to the present invention.

As may be appreciated in FIGURE 1, 1 designates a driving shaft which is usually the power take-off or output shaft of a prime mover such as an internal combustion engine or the like (not shown). A driven shaft 2 which is to be connected to the wheels or the like (not shown) of the vehicle or a machine is driven by the driving shaft 1, through the power transmission system 3 of the present invention.

The power transmission system 3 consists of a housing 4 and a single member pump and hydraulic motor rotor 5 rotatably housed therein, having a front shaft 6 coupled by means of a permanent splined coupling-bushing connection 7 to the driving shaft 1 and a rear shaft 8 connected by means of a variable bushing coupling 9 (to which reference will be made later on) to the driven shaft 2.

The single member pump and hydraulic motor rotor 5, hereinafter simply called "rotor," comprises at the end adjacent the front shaft 6, six series of 60° spaced apart first cylinder bores of different cross-section 10 and 11, respectively, within which pumping pistons 12, 13 are respectively, slidably housed. There are two bores 10 and two bores 11 in each plane, making a total of twelve first cylinder bores in all, said bores being arranged in a star arrangement. Stated differently, the first cylinder bores total 12 in number and are arranged in two axially spaced planes each having six cylinders, parallel to those in the other plane, at 60° intervals in star arrangement, the bores 10 being in one of said planes and the bores 11 being in the other of said planes.

The outer base portion of said pistons are in sliding contact with respective pump delivery control rings 14, 15 position controlled and retained by cams 16, 17 journalled on cam shaft 18 supported by the housing 4 and projecting out of the housing (in this embodiment).

A gear 19 is splined on cam shaft 18, said gear 19 meshing with control rack 20, to which reference will be made later on.

Thus it can already be understood that depending on the position of cams 16 and 17, upon rotating rotor 5, pistons 12 and 13 are able to pump a larger, a smaller or no amount of driving fluid, as will be later seen. Control rack 20 is conveniently guided by a guide bar 21.

Figure 2:
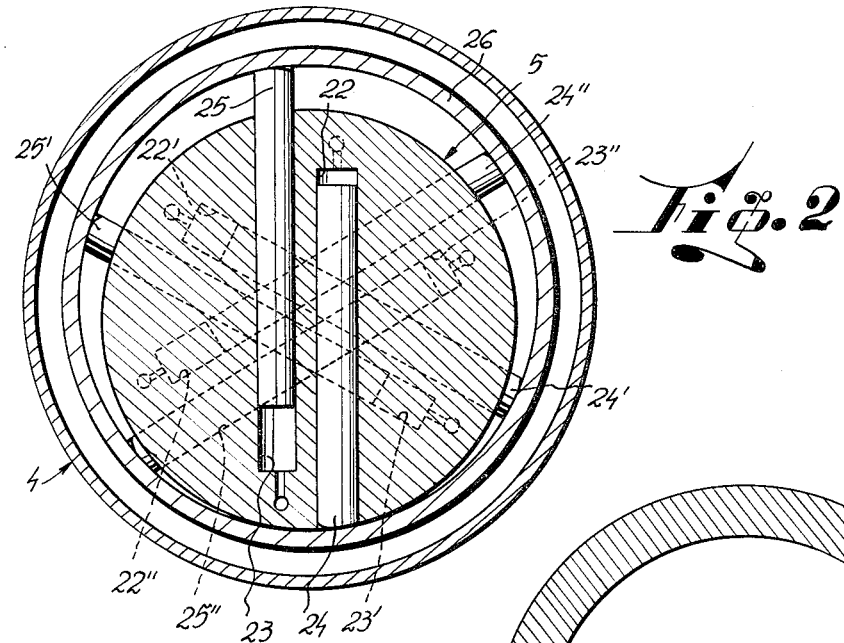
FIGURE 2 is a cross-section along line II—II of FIGURE 1.

Adjacent the opposite end portion of rotor 5, the latter has three pairs of 120° radially spaced second cylinder bores 22, 23; 22', 22'; 23'; 22", 23" (see also FIGURE 2) in which hydraulic motor pistons 24, 25; 24', 25'; 24", 25" are slidably housed. There is a pair of bores (and corresponding pistons) in each plane, making a total of six second cylinder bores (and corresponding pistons) in all, said bores and pistons being arranged in a star arrangement.

Each pair of pistons 22, 23; 22', 23'; 22", 23" are oppositely arranged so that the free end portions which project out of the rotor 5 in opposite directions are adapted to enter in balanced frictional driving relationship, with a cup-shaped fly wheel 26.

The cup-shaped fly wheel 26 is integral with the rear shaft 8 and further suitably supports stub shaft 28 (FIGURE 1) of rotor 5. Collector bore 29 is connected to a hydraulic motor distributor chamber 31 and collector bore 30 is connected to a hydraulic motor distributor chamber 32 (FIGURE 1). Hydraulic motor distributor chambers 31, 32, are coaxially arranged and connected to a central pressure storage chamber 33, further connected to a pair of coaxially arranged pump distributor chambers 34, 35 in turn connected to collector bores 36, 37 ending in the cylinder bores 10, 11 of the pump.

Hydraulic motor distributor chamber 32 and coaxially arranged pump distributor chamber 34, as well as the hydraulic motor distributor chamber 31 and coaxially arranged pump distributor chamber 35 are in addition interconnected by conduits 38, 39. An accumulator 40 is preferably housed in the central pressure storage chamber 33 and filled with a fluid under pressure. Said accumulator 40 is suspended from a support 41.

The hydraulic motor distributor chambers 31 and 32, as well as the coaxially arranged pump distributor chambers 34 and 35 are controlled by distributors 42 and 43, respectively. Since both distributors are of the same type, the structure of distributor 42 will only be described, consisting of a rod 44 coaxially aligned with the hydraulic motor distributor chambers 31 and 32 and having a pair of spaced apart plungers 45, 46 adapted to control the connection of said hydraulic motor distributor chambers 31 and 32 with the central pressure storage chamber 33 or the conduits 38 and 39, respectively.

The lower end of rod 44 is spring urged by spring 47 while the upper end of rod 44 of the distributor 42 is position controlled by a movable cam 48.

Movable cam 48 is position controlled by resistance torque controlled pistons 50, to which reference will be made later on, which, upon being moved, move and rotate, due to the inclined teeth rack connection 51, cam 48, so that a blocking can be achieved.

Figure 3:
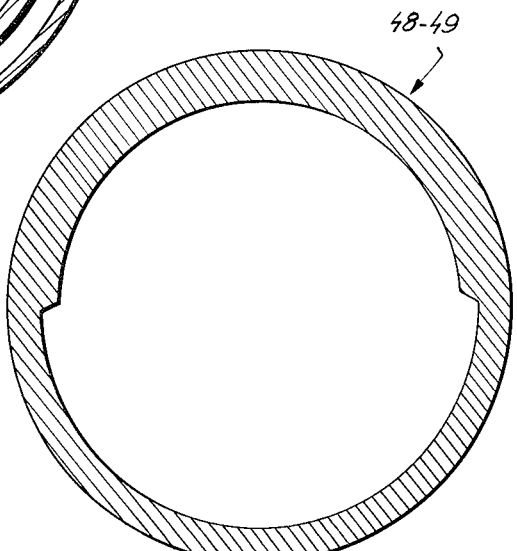
FIGURE 3 is a schematic illustration of the outer shape of the distributor controlling cams.

Both cams 48 and 49 have an inner contour of the shape shown in FIGURE 3.

The rod 44' of the distributor 43 is position controlled by stationary cam 49, integral with housing 4.

For each four coplanar cylinders 10 and 11 there is one rod 44' (star arrangement).

A resistance torque sensing means 52 forms part of the variable bushing coupling 9 which is splined on rear shaft 8 and thereby forced to rotate therewith.

The end portion of bushing 9 opposite to the splined connection is provided with an internal helical groove 53, meshing with screw thread 54 of the end portion of the driven shaft 2. The periphery of the bushing 9 comprises a channelled guide member 55 which is in guiding relationship with a disc 56, integral with a piston member 57, slidably housed in a cylinder member 58, having a fluid inlet 59 and a fluid outlet 60. The inlet 59 is arranged in the base portion, while the outlet 60 is arranged in the cylinder wall. The fluid inlet 59 is connected to a resistance torque sensing means supply conduit 61 and the outlet 60 is connected to a discharge conduit 62, to which reference will be made later on.

Front shaft 6 supports a gear 63, meshing with pinion 64, mounted on shaft 65, for driving an auxiliary control fluid pump 66, the inlet of which is connected to a deposit for control liquid 67 and the outlet of which is connected to a supply pipe 68 provided with a safety valve device 69. Supply pipe 68 is furthermore connected to conduit 70, in turn connected to the resistance torque sensing means supply conduit 61 and conduit 71 is furthermore connected to a distributor 72.

Distributor 72 consists of a cylinder 73 having a base portion 74, a front side 75 and a rear side 76. The upper end of the cylinder 73 could simply be closed by a base portion similar to base 74, but in order to provide certain resiliency for the system, that is to say to change the required power values for carrying out any predetermined operation, the upper end of said cylinder 73 is closed by a piston member 77, which is usually stationary.

A cam follower 78 projects out of the open end of cylinder 73 and is in operative relationship with a control means, such as control cam 79 operable by hand lever 79' as shown in FIGURE 1, or other means as will be later described in connection with FIGURES 5, 6 and 7.

Within cylinder 73 a distributor member 81 is slidably housed, having a cross-wise low pressure passage 82 and a high pressure discharge recess 83, the purpose of which will be later explained.

A compression spring 80 is arranged between the piston member 77 and the upper base of the distributor member 81.

A branch conduit 84 connects conduit 71 with the base portion 74. The cross-wise low pressure passage 82 is adapted to connect conduit 71 with a slide valve supply conduit 85 the other end of which ends in a slide valve 86, to which reference will be made later on. A discharge conduit 87 arranged below the connection of the slide valve supply conduit 85 with the front side 75 is spaced apart therefrom in such a distance that when the distributor member 81 is moved in upward direction, the high pressure discharge recess 83 is able to connect the slide valve supply conduit 85 with the discharge conduit 87. Discharge conduit 87 ends in the deposit for control liquid 67, which is the same deposit as described in connection with the auxiliary control fluid pump 66 but which, in order to avoid overburdening of FIGURE 1, is shown as a separate container and this "convention" is used in several other devices, for instance, discharge conduit 62 ends in the deposit for control liquid 67.

The distributor member 81 comprises a plurality of blocking notches 88 in operative relationship with a resilient ball blocker 89 which will delay the movement of the distributor member 81, and thus distributor member 81 is able to stay in a number of predetermined positions, depending on the fluid pressure in chamber 90 and the load of compression spring 80.

Slide valve 86 consists of a cylinder 91 in which a slide valve member 92 is slidably housed and comprises an I-cross passage 93 adapted to connect slide valve supply conduit 85 with conduit 94, which ends in the lower portion of a blocking cylinder 95. Conduit 94 is furthermore connected to a branch conduit 96 which supplies the control cylinders 97, housing the resistance torque controlled pistons 50, for controlling the movable cam 48, as will be later explained.

Returning to the slide valve 86, the slide valve member 92 is in operative relationship with a resilient ball blocker 89', which is a similar device as resilient ball blocker 89 of distributor 72. Adjacent the connection of conduit 94 with cylinder 91, a pair of discharge conduits 98, 99 are arranged in cylinder 91 each ending into the deposit for control liquid 67 and the I-cross passage 93 is adapted to connect slide valve supply conduit 85 with conduit 94 or with either of discharge conduits 98 and 99. The slide valve member 92 defines by means of its base portions a pair of opposite chambers 100, 101, each having a control fluid supply inlet, respectively connected to conduits 102, 103. Conduit 102 is connected to auxiliary pump 104 driven by shaft 65 and conduit 103 is connected to auxiliary pump 105 driven by shaft 106, which in turn is driven by pinion 107 meshing with gear splined on rear shaft 8. Both auxiliary pumps 104, 105 have their suction pipes connected to the deposit of control liquid 67.

Both chambers 100 and 101 have respective outlets 109 and 110 forming likewise part of control cylinders 111, 112 of identical structure, so that the details thereof will be described only with regard to control cylinder 111.

Control cylinder 111 slidably supports a slide piston 113 including a piston rod 114, further guided in a load control bushing 115, screwed into the respective control cylinders 111 and 112. A compression spring 116 is housed in each control cylinder 111 and 112 arranged between the load control bushing 115 and slide piston 113. Thus, by changing the position of the load control bushing 115, the load of the compression spring 116 may be varied and thereby the pressure required within chamber 100 and 101, respectively, in order to change the position of the slide pistons 113, will have to be different.

The slide piston 113 has a discharge bore 117 adapted to be fully, partially or not connected to the discharge opening 118, within the control cylinder 111.

Furthermore, a vent 119 connects the chamber defined between the slide piston 113 and load control bushing 115 with the outside, in order to avoid that pressure is raised within said chamber.

Finally, chamber 101 is closed by a plug 120 screwed into the cylinder 91 for varying the load of weak compression spring 121 arranged with the chamber 101 and which cooperates with the pressure control fluid entering said chamber 101.

During operation of the entire arrangement, it is possible that the pressure generated by the auxiliary pump 105 is extremely low, when the auxiliary pump 105 is driven at a considerable lower speed than the auxiliary pump 104 and in that event the weak compression spring 121 cooperates in providing an additional resistance against a too fast movement of slide valve members 92 towards plug 120. When the auxiliary pumps 104 and 105 which are of the identical structure, are rotated at substantially identical speeds, the slide valve 86 must connect slide valve supply conduit 85 with conduit 94, since the pressure in chambers 100 and 101 will be balanced.

The discharge bore 117 and discharge opening 118 are necessary, since the auxiliary pumps 104 and 105 continuously supply fluid into the chambers 100 and 101 and said fluid will be under such a pressure that the discharge bore 117 is in full register with the discharge opening 118, thereby discharging substantially the same amount of fluid as supplied by conduits 102 and 103, respectively.

As soon as the pressure decreases at least in one of the chambers 100 and 101, due to speed difference of shafts 1 and 2 the slide piston 113 will move towards the pertinent chamber 100 or 101 and thereby either completely or at least partially close the discharge opening 118.

Conduit 70 and supply pipe 68 are further coupled to a position blocking supply conduit 122 ending through branches 122', 122" in the upper and lower end portions of a position blocking cylinder 123. Supply pipe 68 is further connected to a conduit 124, ending in the upper portion of a position control cylinder 125.

Position blocking cylinder 123 is of larger cross-section than position control cylinder 125, in turn of smaller cross-section than the blocking cylinder 95.

Figure 4:
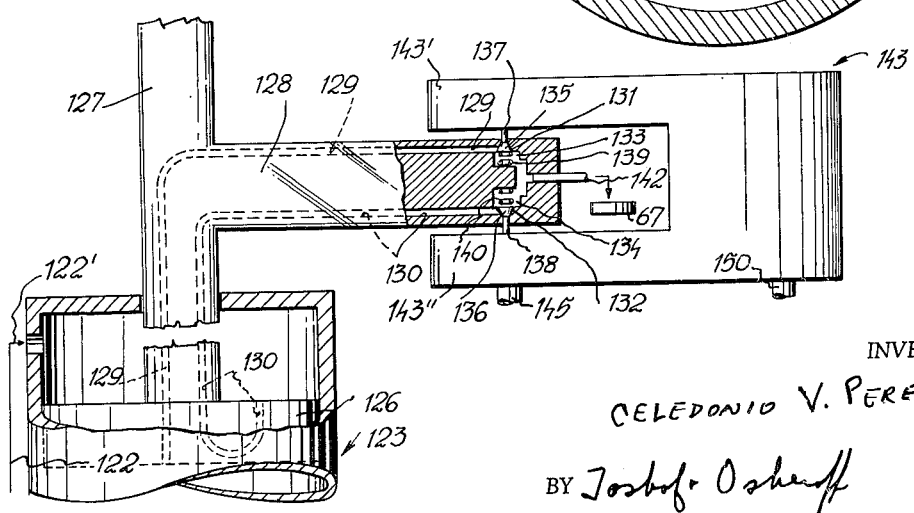
FIGURE 4 is a detail, in larger scale, of the valve control means of the main position locking cylinder for controlling the output of the main pump.

The position blocking cylinder 123 comprises a position blocking piston 126 slidably housed within said position blocking cylinder 123 and comprises, as better shown in FIGURE 4, a stem 127 having a projecting arm 128, which controls the control rack 20.

Stem 127 and projecting arm 128 comprise two inner bores 129, 130 (FIGURE 4), of which the first one ends in the lower face of position blocking piston 126 and inner bore 130 ends in the upper face of the position blocking piston 126. The opposite ends of the inner bores 129, 130, respectively, end in valve seats 131, 132 of the valve chambers 133, 134, controlled by valve heads 135, 136 having valve stems 137, 138, respectively, projecting in opposite directions out of projecting arm 128. Valve heads 135, 136 are urged towards their valve seats 131, 132, by springs 139, 140 thereby blocking the inner bores 129, 130. Valve chambers 133, 134 are connected through discharge conduit 142 to deposit 67.

A valve controlling fork member 143 (see also FIGURE 1) controls by means of its upper branch 143' and lower branch 143" the outwardly projecting free ends of said valve stems 137 and 138 (FIGURE 4), respectively.

Position control cylinder 125 (FIGURE 1) comprises a position control piston 144 slidably housed in said position control cylinder 125 and has a position control piston rod 145 projecting through the upper end of said position control cylinder 125 and being rigidly connected to the lower branch 143" of the valve controlling fork member 143. Within the lower chamber 146 defined by said position control piston 144 a compression spring 147 is housed, urging the position control piston 144 upwardly.

The cylinder 95 is connected at its upper end portion to conduit 148. A piston 149 is slidably housed in said cylinder 95 and has an upwardly projecting piston rod 150, the free end of which is rigidly connected to the valve controlling fork member 143 at a point spaced apart from the linking point of said position control piston rod 145.

In order to control the speed of the engine an accelerator pedal 151 (FIGURE 1) is provided, having a compression spring 152 urging said pedal 151 in an upward direction. Pedal 151 by means of link 153 is furthermore connected to an accelerator distributor 154 slidably housed in a tubular guideway 155.

The accelerator distributor 154 comprises a cross passage 156 the end portions of which are slightly enlarged so that even by varying the position of said accelerator distributor 154 within the tubular guideway 155, within predetermined limit, it is able to connect conduit 148 with conduit 157, further connected to supply pipe 68. Accelerator distributor 154 comprises furthermore an upstanding recess 158 arranged above the cross passage 156 and capable of connecting conduit 148 with a discharge pipe 159 ending in the deposit for control liquid 67 when pedal 151 downwardly presses accelerator distributor 154 in a sufficient magnitude.

As to the operation of the power transmission system, it will be convenient to first describe the operation of the arrangement within housing 4. Upon rotating driving shaft 1, said rotary speed is transmitted through front shaft 6 to rotor 5, whereby pistons 12 and 13 will start a pumping motion if the rings 14 and 15 are eccentrically arranged with regard to rotor 5. Assuming that the pair of "upper" pistons 12 and 13 shown in FIGURE 1 are at that instant moving towards collector bore 36, the fluid housed in cylinder bores 10 and 11 will be pumped under high pressure into collector bore 36, and therefrom into central pressure storage chamber 33, since at this instant the plunger 45 of distributor 43 connects collector bore 36 with the central pressure storage chamber 33. While the fluid enters the central pressure storage chamber 33, the accumulator 40 will be compressed. The fluid within central pressure storage chamber 33 is delivered through the distributor chambers 32, into the pertinent cylinder bores and urges the pertinent pistons, in this particular case pistons 24, 24′, 24″ into frictional engagement with the cup-shaped fly wheel 26, thereby transmitting the power received from driving shaft 1.

At the same time the fluid housed in cylinder bores 23, 23′, 23″ is returned to the hydraulic motor distributor chambers 31 since plungers 46 of the distributors 42 (only one visible in FIGURE 1) block the connection with chamber 33, so that the low pressure fluid from the hydraulic motor distributor chambers 31 passes through conduits 39 (only one visible in FIGURE 1) into the distributor chambers 35 and therefrom through collector bore 37 into the pair of "lower" cylinder bores 10 and 11. As the rotor 5 rotates, every cylinder bore 10, 11 passes from the high pressure or delivery side to the pressure or admission side of the cycle and the same is true for the cylinders of the hydraulic motor 22, 22′, 22″, 23, 23′, 23″. In those instants where no fluid is delivered into central pressure storage chamber 33 and yet the connection to said bores 22, 22′, etc. is open, the accumulator 40 will expand and deliver thus the remaining portion of fluid. The larger the eccentricity of pump delivery control rings 14 and 15 with regard to rotor 5, the more fluid will be pumped to reduce the period of frictional engagement of the free projecting ends of hydraulic motor pistons 24, 24′, 24″, 25, 25′, 25″ which are in contact with cup-shaped fly wheel 26, to thereby transmit power with a slip. If there is no eccentricity whatsoever of pump delivery control rings 14 and 15 with regard to rotor 5 no fluid will be pumped and thereby pistons 24, 24′, 24″, 25, 25′, 25″ cannot reciprocate and thus a direct drive is established between driving shaft 1 and rear shaft 8, since pistons 24, 24′, 24″, 25, 25′, 25″ are in constant friction-clutching engagement with the cup-shaped fly wheel 26. During the direct drive the hydraulic arrangement within housing 4 becomes inoperative. Also, if sufficient fluid is injected into control cylinders 97 mounted in housing 4, as will be later seen, resistance torque controlled pistons 50 will operate on movable cam 48 in such a way that spaced apart plungers 45 and 46 of rod 44 will block cylinder bores 22, 22′, 22″, 23, 23′, 23″, thus again establishing a direct drive.

Dealing now with the entire arrangement of FIGURE 1 from the operative viewpoint, assuming that the driven shaft 2 is braked, as soon as driving shaft 1 starts to rotate front shaft 6, auxiliary control fluid pump 66 will deliver fluid through supply pipe 68, conduit 70, resistance torque sensing means supply conduit 61 into cylinder member 58 and therefrom, since fluid outlet 60 is widely open, into deposit 67.

It must be admitted that at the same time the fluid passes through conduits 71 and 84 maintaining the pressure in chamber 90 at such a value that the control fluid may pass through cross-wise low pressure passage 82 of the piston of the distributor and likewise of slide valve supply conduit 85.

Since the speed of driven shaft 2 is zero, the slide valve 86 does not allow the passage of control fluid towards cylinders 95 and 97.

Furthermore, since accelerator pedal 151 of the accelerator has not been pressed down, the control fluid enters the upper chamber of cylinder 95 carrying the pistons 12 and 13 to its maximum delivery position which is the one corresponding to speed zero for shaft 2.

If it is desired to start to drive driven shaft 2, the driver has to unbrake shaft 2, press down accelerator pedal 151 whereby longitudinal recess 158 will connect conduit 148 with discharge pipe 159 and thereby the volume of fluid housed in the upper chamber of cylinder 95 may be discharged into deposit 67 and this enables compression spring 147 to expand so that position control piston 144 will be able to occupy the maximum torque position that is that the pumps of pistons 12 and 13 will deliver a minimum amount of fluid. Since the speed of rear shaft 8 will be larger than that of driven shaft 2, variable bushing coupling 9 will be axially moved along driven shaft 2, thereby piston member 57 at least partially closing fluid outlet 60, so that the fluid delivered by the auxiliary control fluid pump 66 through supply pipe 68, conduit 70, resistance torque sensing means supply conduit 61 will increase its pressure which in turn will increase the pressure within chamber 90 raising distributor member 81 and disconnecting conduit 71 from slide valve supply conduit 85, so that the fluid housed within the slide valve supply conduit 85, can be discharged through high pressure discharge recess 83 into deposit 67. Any fluid within the lower chamber of cylinder 95 can be discharged through conduit 94, I-cross passage 93 into discharge conduit 99. At the same time, since position control piston 144 will move upward, it opens valve head 136 by urging valve stem 138, so that the fluid housed in the upper chamber of position blocking cylinder 123 can be discharged at the same time as the fluid supplied by position blocking supply conduit 122 will urge position blocking piston 126 upwardly (due to the fluid entering through branch 122″ into position blocking cylinder 123), thereby adjusting the eccentricity of pump delivery control rings 14 and 15.

Since the speed of front shaft 6 will be higher than that of rear shaft 8, the fluid supplied by auxiliary pumps 104 and 105 is not the same, thereby maintaining the position of slide valve member 92 as previously described.

Increase in pressure in the control fluid due to resistance torque sensing means 52 will vary the pressure within upper chamber of position control cylinder 125, thereby carrying out further adjustments on control rack 20.

As the driven shaft 2 gains speed and the resistance torque of driven shaft 2 decreases, piston member 57 will further open fluid outlet 60, so that the pressure within chamber 90 of distributor 72 decreases, whereby, due to the load of compression spring 80, the connection between conduit 71 and slide valve supply conduit 85 will be reestablished. The fluid which flows in slide valve supply conduit 85, will however be unable to enter cylinder 95 due to the fact that slide valve member 92 is shut off and therefore will be discharged through discharge conduit 99. As the resistance torque further decreases, a moment will be reached when the speed of auxiliary pumps 104 and 105 is substantially identical, whereupon the connection between slide valve supply conduit 85 and conduit 94 is reestablished through I-cross passage 93 of slide valve member 92 and thus gradually valve controlling fork member 143 will again be moved in combination with position control piston 144 to change the position of position blocking piston 126 which will operate on rack 20 to cut out the delivery of pistons 12 and 13 at the same time as pressure will be supplied from conduit 94 through conduit 96 into control cylinders 97, which will thereby be able to locate spaced apart plungers 45 and 46 of distributor 42 into the blocking position, as previously described to establish a direct drive.

If the direct drive is to be replaced by a hydraulic drive, then the fluid within control cylinders 97 is discharged, since resistance torque controlled pistons 50 will move in opposite direction due to the pressure of springs 181 and thereby the fluid is discharged through conduit 96, conduit 94 into discharge 98 or 99 to reach deposit 67, depending on the position of slide valve member 92. This will happen for instance if the resistance torque increases, such as for instance if the vehicle has to climb a hill as will be obvious to those skilled in the art.

Instead of simply hand adjusting the load of compression spring 80 by means of control cam 79 in distributor 72, as described in connection with FIGURE 1, such a control could likewise be exerted as a function of the rotary speed, such as by connecting lever 79' (FIGURE 5) to a governor 160 driven by driven shaft 2.

In the alternative of FIGURE 6, the hand lever 79' is controlled through lever 161 by accelerator pedal 151.

A further way of controlling the load of compression spring 80 is by connecting piston member 77 (FIGURE 7) to a control rod 162 controlled by a servo-mechanism 163 in turn controlled by a diaphragm arrangement 164 (only schematically shown) connected to the inlet manifold 165 of the internal combustion engine. If desired, a hand operable lever 166 may be connected to commanding rod 167 which links diaphragm arrangement 164 with servo-mechanism 163 so as to carry out a hand control, which is likewise possible with hand lever 79' in the embodiments of FIGURES 5 and 6.

The hydraulically controlled slide valve 86 of the embodiment of FIGURE 1 may be replaced by a mechanically controlled slide valve 168 (FIGURE 8), in which event the slide valve member 169 comprises a pair of outwardly diametrically opposite projecting rods 170, 171, position controlled by speed governors 172, 173, respectively, which are driven by gears 63 and 108 through chains 182, 183 and chain gears 184, 185, respectively. If the rotary speed of speed governors 172, 173 is substantially equal, I-cross passage 174 connects slide valve supply conduit 85 with conduit 94.

As many embodiments may be made of this inventive concept, and as many modifications may be made in the embodiments hereinabove shown and described, it is to be understood that all matter herein is to be interpreted merely as illustrative and not in a limited sense. The scope of the invention is clearly defined in the appended claims.

I claim:

1. A power transmission system for transmitting a driving torque from a prime mover, having a driving shaft, to a power take-off, controlled by the resistance torque of the power take-off, including a single member pump and hydraulic motor rotor having a front shaft adapted to be coupled to said driving shaft, at least two angularly spaced apart radially arranged first cylinder bores in said rotor adjacent said front shaft, a pumping piston slidably arranged in each of said first cylinder bores and having free ends projecting out of said rotor, a pump delivery control ring member surrounding part of said rotor, said free ends of said pumping pistons abutting against said ring member, means for controlling the eccentricity of said ring member with regard to said rotor, at least two further angularly spaced apart radially arranged second cylinder bores in said rotor and axially spaced apart from said first cylinder bores, a hydraulic motor piston slidably arranged in each of said second cylinder bores and having free ends projecting out of said rotor, distributor means controllably connecting said first cylinder bores to said second cylinder bores, a substantially cup-shaped fly wheel member surrounding said free ends of said hydraulic motor pistons, said cup-shaped fly wheel member having a rear shaft substantially parallel with said front shaft, a driven shaft substantially coaxial with said rear shaft, a control fluid circuit, a control fluid pump coupled to said rotor for said circuit, a resistance torque sensing means controllingly coupling said rear shaft to said driven shaft, said resistance torque sensing means, said means for controlling the eccentricity of said ring member and said distributor means forming part of said control fluid circuit, said resistance torque sensing means controlling the pressure of said control fluid circuit.

2. A power transmission system for transmitting a driving torque from a prime mover, having a driving shaft, to a power take-off, controlled by the resistance torque of the power take-off, including a single member pump and hydraulic motor rotor having a front shaft adapted to be coupled to said driving shaft, at least two pairs of angularly spaced apart radially arranged first cylinder bores in said rotor adjacent said front shaft, each of the two cylinder bores of each pair having different cross-sections, a pumping piston slidably arranged in each of said first cylinder bores and having free ends projecting out of said rotor, two pump delivery control ring members surrounding part of said rotor, said free ends of said pumping pistons abutting against said ring members, means for controlling the eccentricity of said ring members with regard to said rotor, at least two further angularly spaced apart radially arranged second cylinder bores in said rotor and axially spaced apart from said first cylinder bores, a hydraulic motor piston slidably arranged in each of said second cylinder bores and having free ends projecting out of said rotor, distributor means controllably connecting said first cylinder bores to said second cylinder bores, a substantially cup-shaped fly wheel member surrounding said free ends of said hydraulic motor pistons, said cup-shaped fly wheel member having a rear shaft substantially parallel with said front shaft, a driven shaft substantially coaxial with said rear shaft, a control fluid circuit, a control fluid pump coupled to said rotor for said circuit, a resistance torque sensing means controllingly coupling said rear shaft to said driven shaft, said resistance torque sensing means, said means for controlling the eccentricity of said ring members and said distributor means forming part of said control fluid circuit, said resistance torque sensing means controlling the pressure of said control fluid circuit.

3. A power transmission system as claimed in claim 2, wherein said first cylinder bores are angularly spaced through 60° and said second cylinder bores are axially dephased and angularly spaced through 120°, each herein before called second cylinder bore consisting of pairs of second cylinder bores each having a blind end and an open end through which the free end of its hydraulic motor piston projects out, said blind ends are oppositely arranged so that the free ends of said hydraulic motor pistons of each pair project out of said rotor in opposite directions.

4. A power transmission system for transmitting a driving torque from a prime mover, having a driving shaft, to a power take-off, controlled by the resistance torque of the power take-off, including a single member pump and hydraulic motor rotor, a stationary casing, said rotor being housed in said stationary casing, said rotor having a front shaft projecting out of said casing and adapted to be coupled to said driving shaft, at least two angularly spaced apart radially arranged first cylinder bores in said rotor adjacent said front shaft, a pumping piston slidably arranged in each of said first cylinder bores and having free ends projecting out of said rotor, a pump delivery control ring member surrounding part of said rotor, said free ends of said pumping pistons abutting against said ring member, means for controlling the eccentricity of said ring member with regard to said rotor, at least two further angularly spaced apart radially arranged second cylinder bores in said rotor and axially spaced apart from said first cylinder bores, a hydraulic motor piston slidably arranged in each of said second cylinder bores and having free ends projecting out of said rotor, a central pressure storage chamber in said rotor and separating said first cylinder bores from said second cylinder bores, a pair of coaxially arranged pump distributor chambers in said rotor, a pair of hydraulic motor distributor chambers in said rotor, a pair of conduits in said rotor, said pair of pump distributor chambers and said pair of hydraulic motor distributor chambers being interconnected through said pairs of conduits, said pair of coaxially arranged pump distributor chambers being further connected to said first cylinder bores and said pair of hydraulic motor distributor chambers being further connected to said second cylinder bores, said distributor chambers being all connected to said central pressure storage chamber, distributor means, a first distributor controlling said pair of coaxially arranged pump distributor chambers, said distributor means controlling said first distributor, a stationary cam mounted in said casing and controlling said first distributor, a second distributor controlling said pair of hydraulic motor distributor chambers, a substantially cup-shaped fly wheel member surrounding said free ends of said hydraulic motor pistons, said cup-shaped fly wheel member having a rear shaft substantially parallel with said front shaft, said rear shaft projecting out of said casing, a driven shaft substantially coaxial with said rear shaft, a control fluid circuit, a control fluid pump coupled to said rotor for said circuit, a resistance torque sensing means controllingly coupling said rear shaft to said driven shaft, said resistance torque sensing means, said means for controlling the eccentricity of said ring member and said distributor means forming part of said control fluid circuit, said resistance torque sensing means controlling the pressure of said control fluid circuit, a movable cam supported by said casing and position controlled by said control fluid circuit, said movable cam controlling said second distributor.

5. A power transmission system as claimed in claim 4, wherein an accumulator is housed in said central pressure storage chamber, at least one control cylinder supported by said casing, a resistance torque controlled piston housed in said control cylinder, said control cylinder being connected to said control fluid circuit.

6. A power transmission system as claimed in claim 1, comprising a cam position controlled by said control fluid circuit, said pump delivery control ring member being eccentricity controlled by said last mentioned cam.

7. A power transmission system as claimed in claim 1, wherein said resistance torque sensing means comprises a variable bushing-coupling slidably splined on said rear shaft and having an internal helical groove spaced apart from said rear shaft, said driven shaft comprising a screw thread meshing with said helical groove, a channelled guide member on the periphery of said bushing-coupling, a disc in guiding relationship with said guide member, a piston member integral with said disc, a cylinder member having a fluid inlet and a fluid outlet, said piston member being slidably housed in said cylinder member and in controlling relationship with said fluid outlet, said fluid inlet being connected to said control fluid circuit.

8. A power transmission system as claimed in claim 7, wherein said control fluid pump has an inlet and an outlet, a deposit of control liquid, said inlet being connected to said deposit of control liquid, said outlet being connected to said inlet of said cylinder member of said resistance torque sensing means, said outlet of said control fluid pump being furthermore connected to a distributor, in turn connected to a slide valve, said outlet of said control fluid pump being furthermore connected to an accelerator distributor in turn connected to a blocking cylinder, said blocking cylinder housing a piston dividing said cylinder into a first chamber and a second chamber, said accelerator distributor being connected to said first chamber, said outlet of said control fluid pump being furthermore connected to a position control cylinder and said resistance torque sensing means being furthermore connected to a position blocking cylinder, said accelerator distributor being position controlled by an accelerator pedal, said distributor comprising a cylinder having a base portion, a front side and a rear side, a conduit having a branch conduit, said outlet of said control fluid pump being connected to said rear side through said conduit having said branch conduit connected to said base portion, a distributor member slidably housed in said cylinder and resiliently urged towards said base portion, a slide valve supply conduit, said front side being connected to said slide valve supply conduit, the slide valve supply conduit being further connected to said slide valve, and a discharge conduit likewise connected to said front side and ending in said deposit, said distributor member having a cross-wise low pressure passage adapted to connect said first mentioned conduit with said slide valve supply conduit, said distributor member further comprising a high pressure discharge recess adapted to connect said slide valve supply conduit with said deposit.

9. A power transmission system as claimed in claim 8, wherein a piston member is position controllably arranged within said cylinder of said distributor, and a compression spring arranged between said piston member and said distributor member, a cam follower integral with said piston member and projecting out of said last mentioned cylinder, a control cam in operative relationship with said cam follower for position controlling said piston member.

10. A power transmission system as claimed in claim 9, including a hand lever, said control cam is position controlled by said hand lever.

11. A power transmission system as claimed in claim 9, including a governor driven by said driven shaft, said control cam is position controlled by said governor.

12. A power transmission system as claimed in claim 9, wherein said control cam is positioned controlled by said accelerator pedal.

13. A power transmission system as claimed in claim 8, wherein said prime mover has an inlet manifold, a diaphragm arrangement in said inlet manifold, a servomechanism controlled by said diaphragm arrangement, a piston member position controllably arranged within said cylinder of said distributor, a compression spring arranged between said piston member and distributor member, said piston member is position controlled by said servo-mechanism.

14. A power transmission system as claimed in claim 8, wherein said slide valve comprises a slide valve member including a I-cross passage adapted to connect said slide valve supply conduit with said control cylinder mounted in said casing and said second chamber of said blocking cylinder, a further cylinder, said slide valve member being slidably arranged in said further cylinder having a pair of spaced apart discharge conduits, whereby said I-cross passage is adapted to connect said slide valve supply conduit with either of the supply conduits.

15. A power transmission system as claimed in claim 14, comprising a pair of coaxially oppositely arranged rods integral with said slide valve member, a first speed governor driven by said front shaft, a second speed governor driven by said rear shaft, said pair of coaxial oppositely arranged rods being respectively in governing relationship with one of said speed governors.

16. A power transmission system as claimed in claim 14, wherein said slide valve member has a pair of opposite end portions, said end portions defining with said further cylinder a chamber each, a first auxiliary pump driven by said front shaft, a second auxiliary pump driven by said rear shaft, each of said auxiliary pumps being connected to one of said chambers, each of said chambers having a slide piston controlled opening, a control cylinder integral with said last mentioned cylinder and defining said slide piston controlled opening, a slide piston slidably housed in said control cylinder, resilient means urging said slide piston towards said chamber, a discharge opening in said control cylinder, said slide piston having a discharge bore adapted to register with said discharge opening, said chamber to which is connected said auxiliary pump driven by said rear shaft including a load controllable spring bearing on said slide valve member.

17. A power transmission system as claimed in claim 8, wherein said accelerator distributor has a cross-passage connected to said first chamber of said blocking cylinder, when in inoperative position.

18. A power transmission system as claimed in claim 8, wherein said position blocking cylinder is of larger cross-section than said position control cylinder, a position blocking piston slidably housed within said position blocking cylinder and dividing said position blocking cylinder into a first chamber and a second chamber, both of said chambers being connected to said resistance torque sensing means, a stem connected to said position blocking piston having a pair of opposite bores and a pair of inner bores one ending into said first chamber and the other ending into said second chamber on said opposite faces of said blocking piston, a position control piston housed in said position control cylinder, said bores being valve controlled by a valve controlling fork member position controlled by said position control piston, and said piston of said blocking cylinder.

19. A power transmission system as claimed in claim 18, wherein said stem controls said cam of said pump delivery control ring.

20. A power transmission system as claimed in claim 18, including a compression spring housed in said position control cylinder, said position control piston being urged towards said valve controlling fork member by said compression spring.

References Cited by the Examiner

UNITED STATES PATENTS 2,413,301  12/46  Ellis _____ 60—53
2,573,472  10/51  Martin _____ 60—53 X JULIUS E. WEST, *Primary Examiner.*

EDGAR W. GEOGHEGAN, *Examiner.*